W. D. PICKARD.
REAR AXLE ATTACHMENT FOR AUTOMOBILES.
APPLICATION FILED SEPT. 29, 1921.
Patented Aug. 8, 1922.
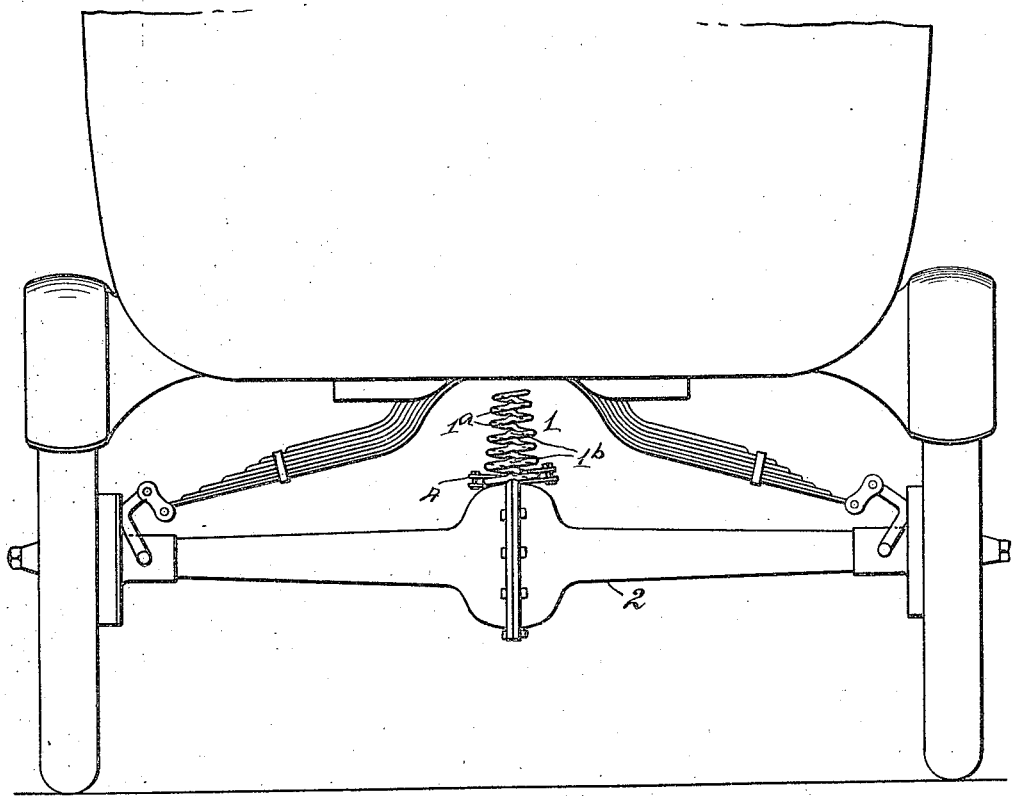
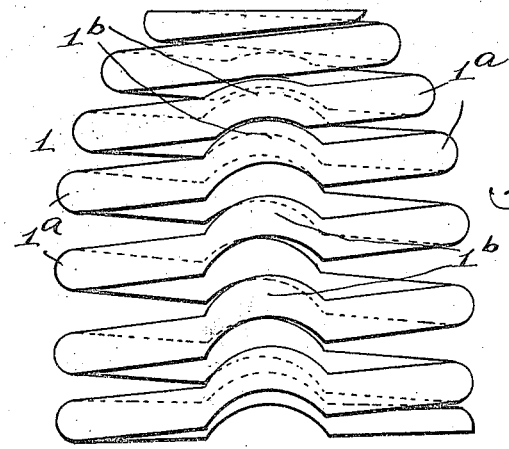

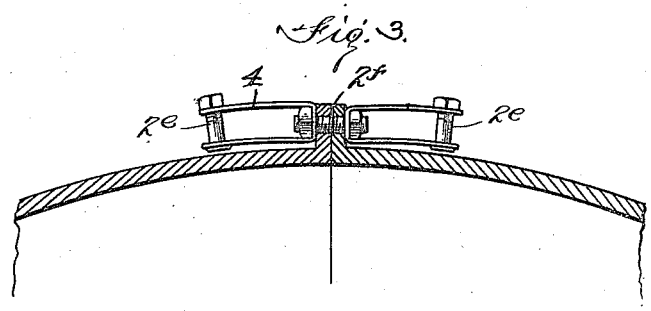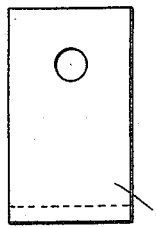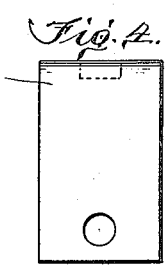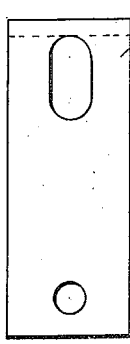

UNITED STATES PATENT OFFICE.

WINFORD D. PICKARD, OF NORMAN, OKLAHOMA.

REAR-AXLE ATTACHMENT FOR AUTOMOBILES.

1,424,940. Specification of Letters Patent. Patented Aug. 8, 1922.

Application filed September 29, 1921. Serial No. 504,008.

*To all whom it may concern:*

Be it known that WINFORD D. PICKARD, a citizen of the United States, residing at Norman, in the county of Cleveland and State of Oklahoma, has invented certain new and useful Improvements in Rear-Axle Attachments for Automobiles, of which the following is a specification.

This invention relates to improvements in automobiles or cars generally, more particularly, however, as an anti-pounding or shock-absorbing appliance between the rear car-spring and the rear axle housing.

The invention has for its object to provide for reinforcing or buffering the yielding or resisting action of the rear spring when the automobile or car is heavily loaded, or it has a weak spring, to prevent the spring from excessive downward yielding action, i. e. "dropping too low" or bumping the automobile-rear axle housing.

It has for a further object to serve as an auxiliary means of increasing durability of the automobile-spring and for much easier riding action.

Other objects of the invention, together with the aforesaid, will be apparent from the following description of the construction, arrangement and application of the same and the accompanying illustration thereof.

The invention consists therefore of certain instrumentalities and features of construction substantially as hereinafter more fully disclosed and pointed out in the appending claims.

In the accompanying illustration or drawings is disclosed the preferred embodiment of my invention, or one form thereof, wherein it will be understood that various changes and modifications as relate to the detailed construction and arrangement of parts may be made without departing from the spirit or scope thereof as covered by the claims, and in which drawings—

Figure 1 is a rear elevation of an automobile, parts being broken away, with my invention applied thereto.

Fig. 2 is a detached view of my invention taken on an enlarged scale.

Fig. 3 is a vertical sectional view, showing more particularly the attaching clamps of my invention.

Figs. 4, 5 and 6 are views at right angles to each other of the attaching clamps of my invention.

Figs. 7, 8 and 9 are corresponding views of the elements of a modified form of attaching clamps of my invention.

As characteristic features of my invention, I provide an auxiliary convoluted resilient member or spring 1, arranged vertically upon the rear axle-housing 2 centrally with respect to the rear car or automobile spring, said latter spring upwardly curving centrally thereof to cooperate with, and receive the upper central smallest coil or terminal of said auxiliary resilient member or spring under excessive load-pressure as later on more fully disclosed. It will be understood, however, that said auxiliary resilient convoluted member or spring is not connected to said rear car-spring, being wholly structurally and in arrangement independent thereof and spaced a predetermined distance from said automobile rear car spring, but is adapted to function with it in case of weakness thereof or when the car is heavily loaded or so that the car-spring would under load-pressure flex downwardly to a point bringing it into contact with the auxiliary spring, the latter then, of course, responding to retain the car-spring against undue or excessive depression, as will be apparent, and thus prevent the car-spring "dropping" down and pounding upon the rear axle housing as would otherwise occur. The auxiliary spring is constituted of a wire of suitable thickness or transverse section, say about $\frac{7}{16}$ inch or other cross section and is formed into a plurality of continuous convolutions or coils 1ª tapered or gradated throughout, the uppermost end one of said convolutions or coils being the smallest and which is arranged adjacent the upwardly curved central portion of the rear car-spring to co-operate or function with the latter in the manner above indicated. The coils or convolutions of the auxiliary spring are each formed with a central arcuate curved or looped portion 1ᵇ, the arcuate portion of the bottom coil conforming to and thereby adapted to provide for facilitating fastening the auxiliary spring to the rear-axle housing, the fastening means being presently described. It will be observed that, as the coiled auxiliary springs are subjected to a compressing action, the portions 1ᵇ will be compactly brought together and thus provide for combining or mutually reinforcing their action, greatly augmenting their resistance or effectiveness as required with the end had in view herein.

The fastenings or means employed for securing the auxiliary spring 1 to the car or automobile, rather to the rear axle-housing 2 thereof, at its centre, comprises preferably a couple of clamps 4 of preferably approximately U or V shape, looped transversely, to the lower or bottom coil or spiral of said spring at opposite sides thereof and suitably secured or bolted to said axle-housing centrally thereof the common bolt 2ᶠ for connecting the axle-housing sections together being withdrawn therefrom and utilized for bolting the clamp-forming members to the axle-housing by inserting said bolt through both the axle-housing sections and the clamp-forming members, additional bolts 2ᵉ being employed for aiding the clamping of the clamp-forming members upon the axle-housing. As disclosed by Figs. 7, 8 and 9, I may employ clamps 5, each comprising a single right-angled member having bolt-receiving openings for the passage of bolts therethrough for bolting the clamp-members to the axle-housing and the bottom terminal or spiral of the auxiliary spring, which is believed readily appreciable.

It will be understood that my invention, although specially adapted for use with the Ford-type of car, it may be readily adapted for use with motors or auto-cars of various types, as is readily apparent.

I claim and desire to secure by Letters Patent:

1. A device of the type described, including a spring of general tapering coiled type, whose coils are formed with looped arcuate portions, in combination with the rear-axle housing of an automobile having upstanding studs received by the flared lower end or base of the spring, nut-equipped bolts inserted transversely through said studs, and proximately U-shaped couplings adapted to be applied to the lower terminal of the spring, and nut-equipped bolts inserted transversely through said couplings and adapted to clamp the arms of said couplings upon said lower spring terminals, the lowermost looped arcuate portion of the spring conforming to, and adapted to seat centrally upon the axle-housing.

2. In a motor-car of the type described, an anti-pounding or shock-absorbing unit including an auxiliary convoluted resilient element whose convolutions are formed with looped or arcuate portions adapted to conform to, and function with the rear axle housing and the rear car-spring.

3. In a motor-car of the type described, an anti-pounding or shock-absorbing instrumentality including an auxiliary convoluted resilient unit, whose spirals or convolutions are formed with loops or arcuate portions adapted, as the convolutions are subjected to a compressing action, to be compactly brought together, and thus augment the resistance or effectiveness of the resilient units for functioning with the anti-pounding action of said auxiliary resilient unit.

In testimony whereof I affix my signature.

WINFORD D. PICKARD.